United States Patent
Msakni Malouche et al.

(10) Patent No.: US 11,548,085 B2
(45) Date of Patent: Jan. 10, 2023

(54) ELECTROLYTE FOR ELECTROCHEMICAL MACHINING OF GAMMA-GAMMA PRIME NICKEL-BASED SUPERALLOYS

(71) Applicants: SAFRAN AIRCRAFT ENGINES, Paris (FR); UNIVERSITE DE LORRAINE, Nancy (FR); CENTRE NATIONAL DE LA RECHERCHE SCIENTIFIQUE, Paris (FR)

(72) Inventors: Mariem Msakni Malouche, Moissy-Cramayel (FR); Janvier Lecomte, Moissy-Cramayel (FR); Mickael Rancic, Moissy-Cramayel (FR); Nicolas Stein, Metz (FR); Clotilde Boulanger, Coin les Cuvry (FR)

(73) Assignees: SAFRAN AIRCRAFT ENGINES, Paris (FR); CENTRE NATIONAL DE LA RECHERCHE SCIENTIFIQUE, Paris (FR); UNIVERSITE DE LORRAINE, Nancy (FR)

( * ) Notice: Subject to any disclaimer, the term of this patent is extended or adjusted under 35 U.S.C. 154(b) by 143 days.

(21) Appl. No.: 17/290,936

(22) PCT Filed: Dec. 17, 2019

(86) PCT No.: PCT/FR2019/053122
§ 371 (c)(1),
(2) Date: May 3, 2021

(87) PCT Pub. No.: WO2020/128304
PCT Pub. Date: Jun. 25, 2020

(65) Prior Publication Data
US 2021/0402496 A1 Dec. 30, 2021

(30) Foreign Application Priority Data
Dec. 17, 2018 (FR) ...................................... 1873037

(51) Int. Cl.
*B23H 3/08* (2006.01)
*C25F 3/22* (2006.01)

(52) U.S. Cl.
CPC ................. *B23H 3/08* (2013.01); *C25F 3/22* (2013.01)

(58) Field of Classification Search
CPC .................................... C25F 3/22; B23H 3/08
See application file for complete search history.

(56) References Cited

U.S. PATENT DOCUMENTS

| 3,409,522 A | * 11/1968 | Grenier | ................. G01N 33/58 |
| | | | 205/684 |
| 5,171,408 A | 12/1992 | Thornton | |

(Continued)

FOREIGN PATENT DOCUMENTS

| CN | 101532164 B | 12/2010 |
| EP | 2 947 183 A1 | 11/2015 |

(Continued)

OTHER PUBLICATIONS

International Search Report as issued in International Patent Application No. PCT/FR2019/053122, dated Apr. 23, 2020.
Search Report as issued in French Patent Application No. 1873037, dated Oct. 10, 2019.

(Continued)

*Primary Examiner* — Nicholas A Smith
(74) *Attorney, Agent, or Firm* — Pillsbury Winthrop Shaw Pittman LLP

(57) ABSTRACT

An electrolyte for electrochemical machining of a γ-γ' nickel-based superalloy includes NaNO₃ at a content of between 10 and 50% by weight relative to the total weight of the electrolyte; an additive chosen from KBr, NaBr, KI, NaI and mixtures thereof, in an additive/NaNO₃ molar ratio of between 1 and 15; optionally an ethylenediaminetetraacetic acid-based complexing agent at a content of (Continued)

between 1 and 5% by weight relative to the total weight of the electrolyte at a pH of between 6 and 12; optionally an anionic surfactant at a content of between 1 and 5% by weight relative to the total weight of the electrolyte; optionally NaOH to obtain the appropriate pH; and an aqueous solvent.

12 Claims, 1 Drawing Sheet

(56) References Cited

U.S. PATENT DOCUMENTS

| | | | |
|---|---|---|---|
| 2005/0145508 A1* | 7/2005 | Larsen | A61L 31/022 |
| | | | 205/684 |
| 2016/0349621 A1 | 12/2016 | Huang et al. | |
| 2016/0362810 A1 | 12/2016 | Trimmer et al. | |

FOREIGN PATENT DOCUMENTS

| | | |
|---|---|---|
| RU | 2 010 895 C1 | 4/1994 |
| RU | 2 489 235 C1 | 8/2013 |
| SU | 390 902 A1 | 7/1973 |
| SU | 419 574 A1 | 3/1974 |
| SU | 1 278 135 A1 | 12/1986 |
| WO | WO-2009108922 A1 * | 9/2009 ........... C22B 11/046 |

OTHER PUBLICATIONS

Surekar, S.H., et al., "Optimization of Parameters in Electrochemical Machining of Ni-Base Superalloy," International Journal of Research in Aeronautical and Mechanical Engineering, vol. 4, Issue 1, Jan. 2016, pp. 72-80.

Mitchell-Smith, J., et al., "Transitory electrochemical masking for precision jet processing techniques," Journal of Manufactuing Processes, vol. 31, Dec. 2017, pp. 273-285.

* cited by examiner

ELECTROLYTE FOR ELECTROCHEMICAL MACHINING OF GAMMA-GAMMA PRIME NICKEL-BASED SUPERALLOYS

CROSS-REFERENCE TO RELATED APPLICATIONS

This application is the U.S. National Stage of PCT/FR2019/053122, filed Dec. 17, 2019, which in turn claims priority to French patent application number 1873037 filed Dec. 17, 2018. The content of these applications are incorporated herein by reference in their entireties.

TECHNICAL FIELD

This invention relates to the field of electrolytes for the electrochemical machining (ECM) of γ-γ' (gamma-gamma prime)-type nickel-based superalloys.

PRIOR ART

ECM is a nonconventional machining process. This process is mainly aimed at electrically conductive materials. The principle of ECM is based on the anodic dissolution of a workpiece (anode) using a tool referred to as a cathode in the presence of an ionically conductive electrolyte. The inter-electrode distance (gap) is defined as the distance between the workpiece to be machined and the cathode. It is of the order of 0.1 to 1 mm.

Precision electrochemical machining (PECM) is based on the same principle of anodic oxidation of the metal. Nevertheless, it is distinguished from ECM by the imposition of a pulsed and non-continuous current. The current is synchronized with an oscillation of the cathode. This oscillation is accompanied by a rectilinear translational movement, but also by a smaller gap (10 to 200 μm). The process thus becomes sensitive to the formation of hydrogen bubbles which form at the cathode and disturb the efficiency of the process.

It is practice nowadays for the machining of γ-γ'-type nickel-based superalloys to be realized in an $NaNO_3$-based electrolyte at concentrations of between 8% and 20% by weight relative to the total weight of the solution. Electrochemical machining (ECM) and its derivatives (precision ECM (PECM), electrochemical deposition (ECD), electrochemical grinding (ECG)) are based on the anodic dissolution of the metal. This dissolution may not be homogeneous due to the complexity of the microstructure of the γ-γ' alloys which in addition to the austenitic matrix contain γ' precipitates, insoluble nitrocarbides and carbides, which forms a rough surface during the machining and requires additional operations for reconditioning the machined surfaces. This dissolution also results in the formation of sludge mainly consisting of metal hydroxides and oxides, a portion of which remains adhered to the electrochemically machined surfaces, which penalizes the dissolution efficiency and the roughnesses of the workpieces to be machined. This dissolution is also accompanied by the formation of dihydrogen at the surface of the cathode, which leads to a fluctuation in and a disturbance of the process. These formed gas bubbles lead to a disturbance of the process due to the small distance between the cathode and the workpiece to be machined (gap of between 10 μm and 200 μm for precision electrochemical machining (PECM)), which reduces the efficiency.

An electrolyte for the electrochemical machining of certain metals (Fe, Cu, Ni, Al, Sn, Cr and Zn) as well as alloys thereof is known. This electrolyte is mainly based on the addition of complexing agents which may be EDTA, HEDTA, NTA or citric acid with a mixture of inorganic salt based on $NaNO_3$, NaCl, $NaClO_4$, $Na_2SO_4$, $KNO_3$, KCl, $KClO_4$, $K_2SO_4$, $LiNO_3$, LiCl, $LiClO_4$, and $Li_2SO_4$ for a concentration range extending from 100 g/L to 500 g/L. The electrolyte also contains a reducing agent such as ascorbic acid. However, this electrolyte does not make it possible to complex the γ-γ' hardening phase which is insoluble, but only the matrix.

There is thus a need to find a novel electrolyte intended for the electrochemical machining of γ-γ'-type nickel-based superalloys which does not exhibit the disadvantages of the prior art.

DISCLOSURE OF THE INVENTION

The inventors have thus discovered, surprisingly, that an electrolyte based on $NaNO_3$ and having a particular composition was perfectly suited to the electrochemical machining of γ-γ'-type nickel-based superalloys, without exhibiting the disadvantages of the prior art, and in particular that this electrolyte makes it possible to reduce the overvoltage of the hydrogen produced at the surface of the cathode, to increase the dissolution efficiency, and produces an improved effect on the reduction of the roughness.

The present invention thus relates to an electrolyte for the electrochemical machining of a γ-γ' nickel-based superalloy, comprising, advantageously essentially consisting of, in particular consisting of:

$NaNO_3$ in a content of between 10% and 50%, advantageously between 10% and 40%, in particular between 10% and 30%, by weight relative to the total weight of the electrolyte;

an additive selected from the group consisting of KBr, NaBr, KI, NaI and mixtures thereof, in particular KBr, in an additive/$NaNO_3$ molar ratio of between 1 and 15, advantageously between 1 and 5, more particularly between 1 and 3, even more particularly between 1 and 2.35, particularly advantageously between 1.5 and 2.35, more advantageously of 1.5;

optionally, a complexing agent based on ethylenediaminetetraacetic acid in a content of between 1% and 5% by weight relative to the total weight of the electrolyte at a pH of between 6 and 12, advantageously 6;

optionally, an anionic surfactant in a content of between 1% and 5% by weight relative to the total weight of the electrolyte;

optionally, NaOH to obtain the appropriate pH;

an aqueous solvent, advantageously water.

The γ-γ' nickel-based superalloy may for example be Udimet 720 from Waspaloy. It may therefore be an NiCrCoTiMoAl alloy having for example the following composition in % by weight: C 0.0100-0.0200; Cr 15.5-16.5; Co 14.0-15.5, Ti 4.75-5.25; Mo 2.75-3.25; Al 2.25-2.75; W 1.00-1.50; Ni making up the balance, and possibly containing zirconium (0.0250-0.0500) and/or boron (0.0100-0.0200).

$NaNO_3$ in a mixture with the additives makes it possible to ensure a homogeneous dissolution and to increase the electrochemical efficiency for all the nickel-based superalloys which contain the γ' phase in their microstructure.

A complexing agent based on ethylenediaminetetraacetic acid (EDTA), in particular EDTA (which may optionally be in monohydrate or dihydrate form) or its derivatives (such as HEDTA: hydroxyethylethylenediaminetriacetic acid and disodium or tetrasodium EDTA), more particularly EDTA, can be present in the electrolyte. It makes it possible to inhibit the formation of sludge, to facilitate the anodic dissolution of the insoluble γ' precipitates and to reduce the roughness of the surfaces. In order to obtain the desired pH (between 6 and 12, advantageously 6) necessary for the use of this complexing agent, it is possible to add NaOH to the electrolyte according to the invention.

An anionic surfactant may be present in the electrolyte. It also makes it possible to reduce the overvoltage of the hydrogen produced at the surface of the cathode and which causes disturbances during the machining process, and to increase the dissolution efficiency. In an advantageous embodiment, the anionic surfactant is selected from the group consisting of saccharin, sodium dodecylsulphate, sulfonates, carboxylates, sulfocinates, phosphates, and mixtures thereof; advantageously it is selected from the group consisting of saccharin, sodium dodecylsulphate, and mixtures thereof.

The electrolyte according to the invention makes it possible to ensure a homogeneous anodic dissolution of all the phases of the γ-γ' nickel-based superalloy. It also makes it possible to guarantee good surface finishes with an optimization of the efficiency and of the dissolution rate and a reduction of the residues formed.

The electrolyte according to the invention is prepared by methods well known to those skilled in the art, by simple addition and mixing of the various components in the aqueous solvent.

The present invention additionally relates to the use of the electrolyte according to the invention for the electrochemical machining of a γ-γ' nickel-based superalloy, in particular the precision electrochemical machining of a γ-γ' nickel-based superalloy, the electrochemical deposition (ECD) of a γ-γ' nickel-based superalloy or the electrochemical grinding (ECG) of a γ-γ' nickel-based superalloy.

It further relates to a process for the electrochemical machining of a γ-γ' nickel-based superalloy, comprising the following successive steps:
a—providing a γ-γ' nickel-based superalloy workpiece as an anode;
b—providing a tool as a cathode;
c—providing an electrolyte according to the present invention;
d—immersing the anode and the cathode in the electrolyte with an inter-electrode distance of between 0.1 and 1 mm;
e—applying a continuous current between the anode and the cathode so as to achieve the anodic dissolution of the γ-γ' nickel-based superalloy workpiece;
f—recovering the machined workpiece obtained in step e).

The tool that can be used as a cathode in step b) of the electrochemical machining process according to the invention is mainly made of stainless steel, but can also be made of titanium alloys, platinum alloys, copper-based alloys or copper-tungsten alloys.

The current of step e) can have a voltage in the range from 4 to 30 V. Its current density is advantageously 12.8 A/cm$^2$. The application of the continuous current in the context of the electrochemical machining process according to the invention makes it possible to circulate the electrolyte continuously between the cathode and the anode during step e) with a sufficient flow rate, in particular obtained using a pressure of between 3.5 and 4 bar (between 350 000 and 400 000 Pa), in order to evacuate the residues of the anodic dissolution (sludge and dihydrogen) and to guarantee an optimal dissolution rate. The dissolution rate is the difference in mass before and after machining divided by the machining time. It is advantageously greater than or equal to 80 mg/min.

The optimum dissolution efficiency advantageously obtained by the process according to the invention is greater than or equal to 90% by mass. It is calculated as shown in comparative example 1.

Lastly, the present invention relates to a process for the precision electrochemical machining of a γ-γ' nickel-based superalloy, comprising the following successive steps:
A—providing a γ-γ' nickel-based superalloy workpiece as an anode;
B—providing a tool as a cathode;
C—providing an electrolyte according to the invention;
D—immersing the anode and the cathode in the electrolyte;
E—applying a pulsed current between the anode and the cathode, synchronized with a possible oscillation of the cathode, and accompanied by a possible rectilinear translational movement of the cathode towards the anode making it possible to obtain a minimum inter-electrode distance of 10 to 200 μm, so as to achieve the anodic dissolution of the γ-γ' nickel-based superalloy workpiece;
F—recovering the machined workpiece obtained in step E).

The tool that can be used as a cathode in step B) of the electrochemical machining process according to the invention is mainly made of stainless steel, but can also be made of titanium alloys, platinum alloys, copper-based alloys or copper-tungsten alloys.

The current of step E) can have a voltage which can range from 6 V to 18.7 V. The amplitude of the oscillations can be between 0.2 and 0.8 mm, preferably 0.4 mm. The frequency of the oscillations can be between 27 to 70 Hz and the duration of the pulses can be between 2 and 10 ms.

Step E) can be implemented with or without oscillation of the cathode, advantageously with oscillation of the cathode. If it is implemented without oscillation, continuous displacement of the cathode (only with current pulses) may be present.

Step E) can also be implemented in dynamic mode (with rectilinear translational movement of the cathode towards the anode) or in static mode (without rectilinear translational movement of the cathode towards the anode), with current pulses and optionally with associated oscillations for surface reconditioning or polishing operations (removal<1 mm). Thus, step E) of the process according to the invention can be implemented in static mode, without rectilinear translational movement of the cathode towards the anode, or step E) of the process according to the invention can be implemented in dynamic mode, with rectilinear translational movement of the cathode towards the anode.

The invention will be better understood in the light of the description of the figures and of the examples which follow.

EXAMPLES

Comparative Example 1

The first step was to separately synthesize the Ni$_3$Ti hardening phase (γ' phase). Two electrolytes were then tested in an ECM process under conditions differing slightly from ECM (gap greater than 2 mm and low current density: 178 mA/cm$^2$):
solution A: 2.35 M sodium nitrate in water
solution B: 2.35 M potassium bromide in water.

Figure 1:
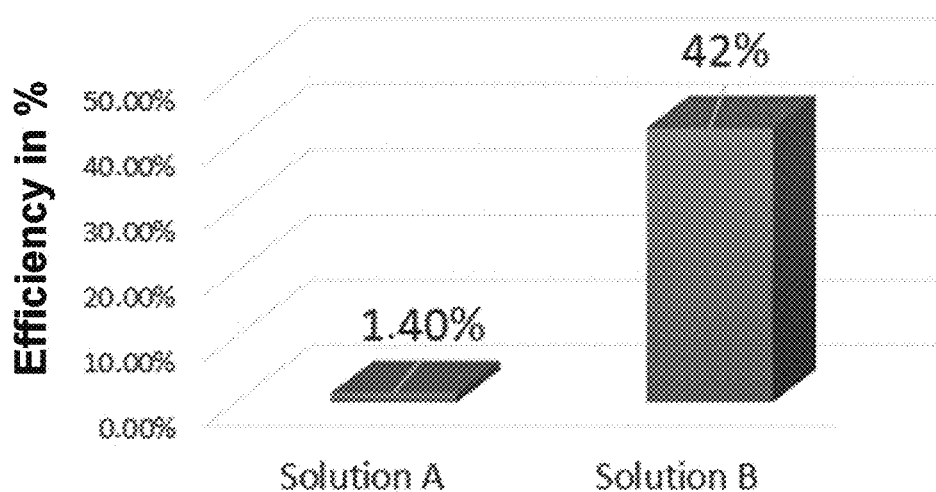
FIG. 1 shows the efficiency of dissolution of the γ' phase under ECM conditions for a low current density of 178 mA/cm$^2$ as a function of the electrolyte used (solution A or B) of comparative example no. 1.

The dissolution efficiencies are shown in FIG. 1. They are calculated as follows:

Only nickel was considered as electroactive element for the sake of simplicity. The anodic reaction is then:

$$Ni \rightarrow Ni^{2+} + 2e^-$$

The theoretical mass loss $\Delta W_{theo}$ of the samples is established from the following relation:

$$\Delta Wtheo = \frac{M \times I \times t}{n \times F}, \quad (1)$$

M being the atomic molar mass of nickel, I being the applied current, t being the duration of the oxidation, n being the valence of the dissolved ions (n=2) and F being the Faraday constant=96 500 C/mol.

A Faraday efficiency of 100% has been assumed. The efficiency is then defined by:

$$\eta = \frac{\Delta Wexp}{\Delta Wtheo} \quad (2)$$

with $\Delta W_{exp}$ being the difference in mass before and after the test and following a final surface cleaning.

It is observed that the γ' phase is practically insoluble in nitrate medium (medium A) and goes from 1.4% to 42% efficiency with the use of a potassium bromide medium (medium B).

However, in a similar ECM process but implemented on the Udimet 720 γ-γ' nickel-based superalloy from Waspaloy in medium B, a deterioration in volume of the material was noticed, the material becoming porous. It appeared to be necessary to find an alternative electrolyte having a compromise between the effect of bromides and that of nitrates.

Example 1

Electrolyte C=1.6 M NaNO₃+2.35 M KBr (KBr/NaNO₃ molar ratio=1.5), was tested in an ECM process identical to that of comparative example 1 but implemented on the Udimet 720 γ-γ' nickel-based superalloy from Waspaloy, and good results are obtained, without deterioration in volume of the material.

Different molar ratios of NaNO₃ and KBr (R) were also tested as shown in table 1 below.

TABLE 1

| $R = \frac{[KBr]}{[NaNO3]}$ | 0 | 0.2 | 0.7 | 1 | 1.6 | 2.35 | ∞ |
|---|---|---|---|---|---|---|---|
| [KBr] mol/L | 0 | 0.5 | 1.6 | 2.35 | 2.35 | 2.35 | 2.35 |
| [NaNO₃] mol/L | 2.35 | 2.35 | 2.35 | 2.35 | 1.5 | 1 | 0 |

The microstructure was monitored after each test as a function of the different ratios. The results of greatest interest are obtained for molar ratios between 1 and 2.35.

Thus in NaNO₃ medium and in the absence of KBr (KBr/NaNO₃ molar ratio=0), the dissolution occurs inhomogeneously. Specifically, the gamma matrix is preferentially dissolved with respect to the gamma prime precipitates which become dislodged while leaving a rough surface.

By introducing KBr, the size and also the dispersion of the gamma prime precipitates (gray particles) are reduced and the dissolution+dislodging phenomenon observed in NaNO₃ medium becomes a phenomenon of co-dissolution of the two phases (gamma and gamma prime).

However, for a proportion of less than 1 (KBr/NaNO₃ molar ratio <1), the desired effect of co-dissolution is not ensured.

On the other hand, the use of the medium based on 100% KBr was rejected because of the deterioration of the surface after the anodization tests.

Comparative Example 2

In addition, the following electrolyte solutions were tested under the same conditions as in comparative example 1:
Solution A: 2.35 M NaNO₃ in water.
Solution B: 2.35 M KBr in water.
Solution C: 2.35 M KCl in water.

Figure 2:
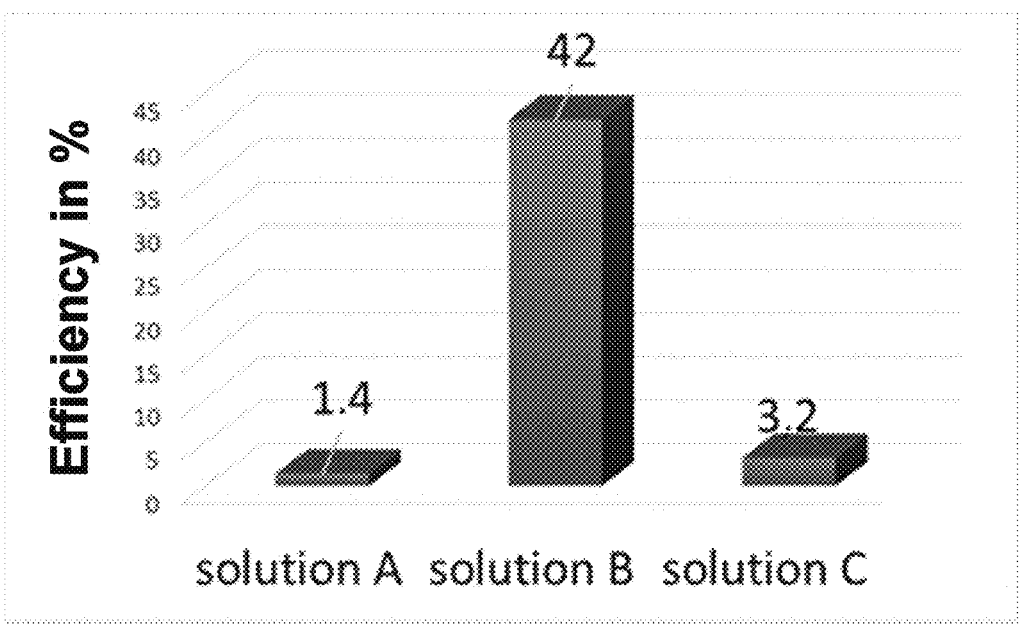
FIG. 2 shows the efficiency of dissolution of the γ' phase under ECM conditions for a low current density of 178 mA/cm$^2$ as a function of the electrolyte used (solution A, B or C) of comparative example no. 2.

The dissolution efficiencies are shown in FIG. 2. It is observed that solution B, which contains bromides, is more effective for the dissolution of the gamma prime phase because the bromides, in addition to being a pitting agent, are also complexing agents and their complexing power is greater than for the chlorides, which are nevertheless part of the same family as the bromides (halogen family).

Example 2

In addition, the following electrolyte solution was tested under the same conditions as in example 1:

Electrolyte=1.6 M NaNO₃+2.35 M KBr (molar ratio=1.5)+0.1 M EDTA+NaOH in water (pH 6).

The disappearance of the metal oxide layer from the machined surface is observed, but in contrast no problem of porosity on the material appeared. The results obtained are better than those of example 1. The presence of EDTA therefore has a positive effect on the electrolyte and hence on the machining.

Example 3

Metallographic sections were also created after testing on a PECM machine under the same conditions as comparative example 1 and compared in NaNO₃ medium (solution A of comparative example 2), NaNO₃+KBr (KBr/NaNO₃ molar ratio (R)=2.35 of example 1) and NaNO₃+KBr+0.1 M EDTA (KBr/NaNO₃ molar ratio (R)=2.35) (electrolyte=1 M NaNO3+2.35 M KBr+0.1 M EDTA).

In NaNO₃ medium (KBr/NaNO₃ molar ratio (R)=0) a layer of dissolution residue product is formed at the surface. The removal of this layer requires additional operations such as chemical pickling or mechanical removal (sandblasting). In the presence of KBr (KBr/NaNO₃ molar ratio=2.35), this layer is almost absent.

ICP analyses were also carried out on the spent baths after machining operation in order to determine the content of dissolved elements according to the different media.

Table 2 below summarizes the percentage by mass of the major elements of the material.

A clear enrichment was observed in a medium having a KBr/NaNO₃ molar ratio=2.35 for the elements Ni, Ti and W, compared to the NaNO₃ medium. This enrichment is more pronounced in the presence of EDTA used at a level of 0.1 M as complexing agent.

TABLE 2

| | Ni (% by weight) | Cr (% by weight) | Co (% by weight) | Mo (% by weight) | Al (% by weight) | Ti (% by weight) | W (% by weight) |
|---|---|---|---|---|---|---|---|
| NaNO$_3$ | 46.9 | 22.5 | 16.3 | 4.6 | 0.0 | 1.2 | 3.9 |
| R = 2.35 | 50.7 | 21.1 | 14.9 | 5.0 | 0.7 | 3.0 | 4.8 |
| R = 2.35 with EDTA | 49.9 | 14.3 | 13.6 | 5.7 | 1.1 | 4.4 | 6.5 |

The invention claimed is:

1. An electrolyte for an electrochemical machining of a γ-γ' nickel-based superalloy, comprising
NaNO$_3$ in a content of between 10% and 50% by weight relative to the total weight of the electrolyte;
an additive selected from the group consisting of KBr, NaBr, KI, NaI and mixtures thereof in an additive/NaNO$_3$ molar ratio of between 1 and 15;
optionally, a complexing agent based on ethylenediaminetetraacetic acid in a content of between 1% and 5% by weight relative to the total weight of the electrolyte at a pH of between 6 and 12;
optionally, an anionic surfactant in a content of between 1% and 5% by weight relative to the total weight of the electrolyte;
optionally, NaOH to obtain the appropriate pH;
an aqueous solvent.

2. The electrolyte as claimed in claim 1, comprising the anionic surfactant.

3. The electrolyte as claimed in claim 2, wherein the anionic surfactant is selected from the group consisting of saccharin, sodium dodecylsulphate, sulfonates, carboxylates, sulfocinates, phosphates, and mixtures thereof.

4. The electrolyte as claimed in claim 2, wherein the anionic surfactant is selected from the group consisting of saccharin, sodium dodecylsulphate and mixtures thereof.

5. The electrolyte as claimed in claim 1, wherein the additive is KBr.

6. The electrolyte as claimed in claims 1, comprising the complexing agent based on ethylenediaminetetraacetic acid.

7. The electrolyte as claimed in claim 6, wherein the complexing agent is ethylenediaminetetraacetic acid.

8. A process for the electrochemical machining of a γ-γ' nickel-based superalloy, comprising the following successive steps:
a providing a γ-γ' nickel-based superalloy workpiece as an anode;
b providing a tool as a cathode;
c providing the electrolyte as claimed in claim 1;
d immersing the anode and the cathode in the electrolyte with an inter-electrode distance of between 0.1 and 1 mm;
e applying a continuous current between the anode and the cathode so as to achieve the anodic dissolution of the γ-γ' nickel-based superalloy workpiece;
f recovering the machined workpiece obtained in step e).

9. A process for a precision electrochemical machining of a γ-γ' nickel-based superalloy, comprising the following successive steps:
A providing a γ-γ' nickel-based superalloy workpiece as an anode;
B providing a tool as a cathode;
C providing the electrolyte as claimed in claim 1;
D immersing the anode and the cathode in the electrolyte;
E applying a pulsed current between the anode and the cathode, synchronized with a possible oscillation of the cathode, and accompanied by a possible rectilinear translational movement of the cathode towards the anode making it possible to obtain a minimum inter-electrode distance of 10 to 200 μm, so as to achieve the anodic dissolution of the γ-γ' nickel-based superalloy workpiece;
F recovering the machined workpiece obtained in step E).

10. The process as claimed in claim 9, wherein step E) is implemented in static mode, without rectilinear translational movement of the cathode towards the anode.

11. The process as claimed in claim 9, wherein step E) is implemented in dynamic mode, with rectilinear translational movement of the cathode towards the anode.

12. The process as claimed in claims 9, wherein step E) is implemented with oscillation of the cathode.

* * * * *